(12) United States Patent
Chang et al.

(10) Patent No.: US 6,281,884 B1
(45) Date of Patent: Aug. 28, 2001

(54) GENERAL CHINESE PHONETIC KEYBOARD SETTING APPARATUS

(75) Inventors: Ling-Min Chang; Ming-Shiun Hsieh, both of Taipei (TW)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/358,889

(22) Filed: Jul. 22, 1999

(30) Foreign Application Priority Data

Aug. 18, 1998 (JP) .................................................. 10-231660

(51) Int. Cl.[7] ...................................................... G09G 5/00
(52) U.S. Cl. ........................ 345/171; 341/28; 400/109; 400/110; 400/484
(58) Field of Search ............................. 345/171; 341/28; 400/110, 109, 484

(56) References Cited

U.S. PATENT DOCUMENTS

| | | | |
|---|---|---|---|
| 4,484,305 | * 11/1984 | Ho | 707/535 |
| 5,212,638 | * 5/1993 | Bernath | 707/535 |
| 5,331,557 | * 7/1994 | Liu | 707/535 |

FOREIGN PATENT DOCUMENTS

| | | |
|---|---|---|
| 73889 | 1/1986 | (CN) . |
| 73890 | 1/1986 | (CN) . |
| 89476 | 8/1987 | (CN) . |
| 119811 | 10/1989 | (CN) . |
| 1105763 | 7/1995 | (CN) . |
| 4-31615 | 5/1992 | (JP) . |

\* cited by examiner

Primary Examiner—Richard Hjerpe
Assistant Examiner—Kevin M Nguyen
(74) Attorney, Agent, or Firm—Greenblum & Bernstein, P.L.C.

(57) ABSTRACT

A general Chinese phonetic keyboard setting apparatus enables the user to define a phonetic keyboard in a computer system. The user can define a key to correspond with a Chinese phonetic character (one key, one sound), or one key to correspond with several Chinese phonetic characters (one key, several sounds), or a Chinese phonetic character to correspond with several keys (one sound, several keys). Based on mutual acceptance and mutual rejection among finals, initials, medials and tones of the Chinese phonetic characters, whether or not the Chinese phonetic keyboard that was defined by the user is rational can be automatically verified to aid the user in defining a logical Chinese phonetic keyboard. Not only can the Chinese character input habit of different people can be satisfied, the Chinese character input speed can also be increased.

2 Claims, 8 Drawing Sheets

| GROUPING \ GROUPING | | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | ㄅㄆㄇㄈㄉㄊㄋㄌ | × | × | × | × | × | × | ○ | ○ | ○ | ○ | ○ | ○ | ○ |
| 2 | ㄍㄎㄏ | × | × | ○ | × | × | × | ○ | ○ | ○ | ○ | ○ | ○ | ○ |
| 3 | ㄐㄑㄒ | × | ○ | × | ○ | ○ | ○ | ○ | ○ | ○ | ○ | ○ | ○ | ○ |
| 4 | ㄓㄔㄕㄖㄗㄘㄙ | × | × | ○ | × | × | × | × | × | ○ | ○ | ○ | × | ○ |
| 5 | ㄧㄩ | × | × | ○ | × | × | × | × | × | ○ | × | × | × | ○ |
| 6 | ㄨ | × | × | ○ | × | × | × | × | × | ○ | × | × | × | × |
| 7 | ㄚㄛㄞㄠㄡㄢㄣㄤ | ○ | ○ | ○ | × | × | × | × | × | × | × | × | × | × |
| 8 | ㄜ | ○ | ○ | ○ | × | × | × | × | × | ○ | × | × | × | × |
| 9 | ㄝ | ○ | ○ | ○ | ○ | ○ | ○ | × | ○ | × | ○ | × | ○ | × |
| 10 | ㄟ | ○ | ○ | ○ | ○ | × | × | × | × | ○ | × | × | ○ | × |
| 11 | ㄥ | ○ | ○ | ○ | ○ | × | × | × | × | × | × | × | ○ | × |
| 12 | ㄦ | ○ | ○ | ○ | × | × | × | × | × | ○ | ○ | ○ | × | ○ |
| 13 | TONE ˊ ˇ ˋ ˙ | ○ | ○ | ○ | ○ | ○ | × | × | × | × | × | × | ○ | × |

FIG.4

GENERAL CHINESE PHONETIC KEYBOARD SETTING APPARATUS

BACKGROUND OF THE INVENTION

1. Field of the Invention

The invention relates to a general Chinese phonetic keyboard setting apparatus which uses computer techniques to enable the user to define a Chinese phonetic keyboard in a computer system that suits the Chinese character input habit of the user, and which is capable of automatically determining whether or not the Chinese phonetic keyboard that was defined by the user is rational based on mutual acceptance and mutual rejection among finals, initials, medials and tones of the Chinese language.

2. Description of the Prior Art

The technique of using a keyboard in a computer system to input Chinese characters has been around for many years. While advancements have been made in the fields of Chinese handwriting recognition and speech recognition, it is believed that the input of Chinese characters will still be achieved mainly with the use of a computer keyboard in the coming years. Not a few developers of numerous Chinese input methods have maintained that their input method is the quickest. However, in some places like Taiwan, more than half of computer users prefer the use of Chinese phonetic characters to input Chinese characters especially because they have been trained in Chinese phonetics since their elementary years.

The most common Chinese phonetic keyboard assigns one computer key to one Chinese phonetic character. This is the so-called "one key, one sound" method. It is noted that there are 37 Chinese phonetic symbols and 4 tones in the Chinese language. As such, a total of 41 computer keys (including the first tone, which is assigned the space bar key) is needed before a Chinese phonetic keyboard can be completely defined. As to the arrangement of the Chinese phonetic keyboard, this can be done according to the sequence of the Chinese phonetic symbols, such as in the standard Chinese phonetic keyboard of FIG. 6, and in the IBM Chinese phonetic keyboard of FIG. 7. Other Chinese phonetic keyboards associate the Chinese phonetic symbols with alphanumeric characters, such as in the I Tien Chinese phonetic keyboard of FIG. 8.

In the early years since the development of Chinese phonetic input methods, users of Chinese phonetic input methods made little demands on the arrangement of the Chinese phonetic keyboard because of a severe problem caused by the need to select from among different Chinese characters that sound alike, and because the conversion efficiency when using Chinese phonetics is actually not very high. With the advent of intelligent Chinese phonetic input methods in recent years, some people started to notice the arrangement of Chinese phonetic keyboards, thus leading to the use of only the 26 letters of the English alphabet and the space bar key, which represents the first tone, to define a Chinese phonetic keyboard. This is the so-called "one key, several sounds" method. The more popular Chinese phonetic keyboards of the aforementioned type include the I Tien 26-key Chinese phonetic keyboard (see FIG. 9) and the Hsu Shih Chinese phonetic keyboard (see FIG. 10).

The arrangements of the various Chinese phonetic keyboards mentioned above have their own advantages and disadvantages. However, once the user has become accustomed to a particular Chinese phonetic keyboard arrangement, it will be inconvenient for the user to use another Chinese phonetic keyboard to input Chinese characters when the computer system is replaced. The input speed will also be dramatically reduced.

Moreover, since the arrangements of the aforementioned conventional Chinese phonetic keyboards are fixed according to the design specifications of the manufacturer, they cannot be expected to satisfy the needs and habits of different users. Thus, it is desirable to provide an apparatus that enables the user to define his or her own Chinese phonetic keyboard.

SUMMARY OF THE INVENTION

Therefore, the main object of the present invention is to provide a general Chinese phonetic keyboard setting apparatus which enables the user to define a Chinese phonetic keyboard in a computer system that suits the Chinese character input habit of the user.

Another object of the present invention is to provide a general Chinese phonetic keyboard setting apparatus which is capable of automatically determining whether or not the Chinese phonetic keyboard that was defined by the user is rational based on mutual acceptance and mutual rejection among finals, initials, medials and tones of the Chinese language.

According to this invention, a general Chinese phonetic keyboard setting apparatus comprises:

a computer mouse;

a standard computer keyboard of a computer system;

a display device;

a memory device having a character sound grouping rules table stored therein, the table grouping Chinese phonetic characters into several groups based on mutual acceptance and mutual rejection among finals, initials, medials and tones of the Chinese phonetic characters;

a phonetic keyboard position defining device connected to the computer mouse, the standard computer keyboard and the display device, the phonetic keyboard position defining device generating a simulated computer keyboard that is a computer simulation of the standard computer keyboard, and controlling the display device to show the simulated computer keyboard and a set of the Chinese phonetic characters thereon, the phonetic keyboard position defining device further permitting a selected one of the Chinese phonetic characters to be set on a selected key of the simulated computer keyboard through use of the computer mouse;

a phonetic keyboard position register connected to the phonetic keyboard position defining device, and storing the Chinese phonetic characters and positions thereof on the simulated computer keyboard as defined through use of the phonetic keyboard position defining device;

a phonetic keyboard position verifying device connected to the phonetic keyboard position register and the memory device, the phonetic keyboard position verifying device referring to the character sound grouping rules table in the memory device and comparing the Chinese phonetic characters and the positions thereof on the simulated computer keyboard as stored in the phonetic keyboard position register to verify if the positions of the Chinese phonetic characters on the simulated computer keyboard as defined can be established; and a phonetic keyboard storage device connected to the phonetic keyboard position verifying device to store phonetic keys that were verified thereby, the phonetic keyboard storage device being further connected to the standard computer keyboard for signal transmission therewith.

Preferably, the character sound grouping rules table is based on the table shown in FIG. 4.

The general Chinese phonetic keyboard setting apparatus of the present invention having the above-described construction enables the user to move a Chinese phonetic character of the phonetic keyboard position defining device to the simulated computer keyboard on the display device with the use of the computer mouse to define a Chinese phonetic keyboard. The user can define a Chinese phonetic character on one or more keys, and can define several Chinese phonetic characters on one key. After the user has defined the keyboard position of a Chinese phonetic character, the Chinese phonetic character and the defined keyboard position thereof on the simulated computer keyboard are stored in the phonetic keyboard position register. Thereafter, the phonetic keyboard position verifying device compares the Chinese phonetic characters stored in the phonetic keyboard position register thereamong with reference to the character sound grouping rules table to verify if a conflict has occurred among the Chinese phonetic characters that have been defined. As long as no conflict has occurred, the result of the definition using the phonetic keyboard position defining device is shown on the display device, and the defined phonetic keys are stored in the phonetic keyboard storage device for signal transmission with the standard computer keyboard.

BRIEF DESCRIPTION OF THE DRAWINGS

Other features and advantages of the present invention will become apparent in the following detailed description of the preferred embodiment with reference to the accompanying drawings, of which:

FIG. 4 illustrates a character sound grouping rules table of the preferred embodiment of the present invention;

DESCRIPTION OF THE EMBODIMENTS

Figure 1:
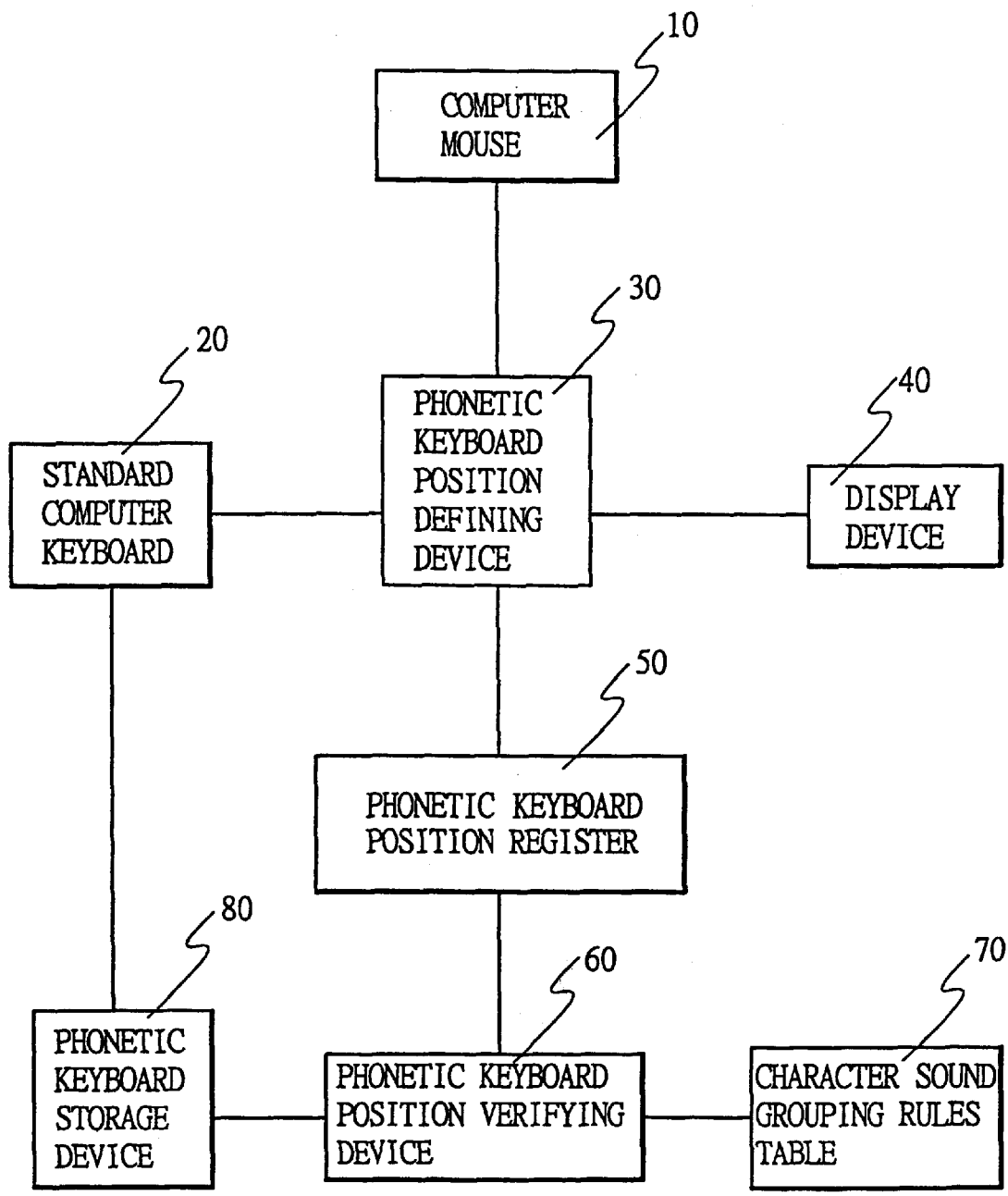
FIG. 1 is a schematic system block diagram of the preferred embodiment of a general Chinese phonetic keyboard setting apparatus according to the present invention.

Referring now to FIG. 1 which illustrates a schematic system block diagram of the preferred embodiment of a general Chinese phonetic keyboard setting apparatus according to the present invention, reference numeral 10 denotes a computer mouse. Reference numeral 20 denotes a standard computer keyboard. Reference numeral 40 denotes a display device. Reference numeral 30 denotes a phonetic keyboard position defining device which enables the user to define a Chinese phonetic keyboard.

Figure 3:
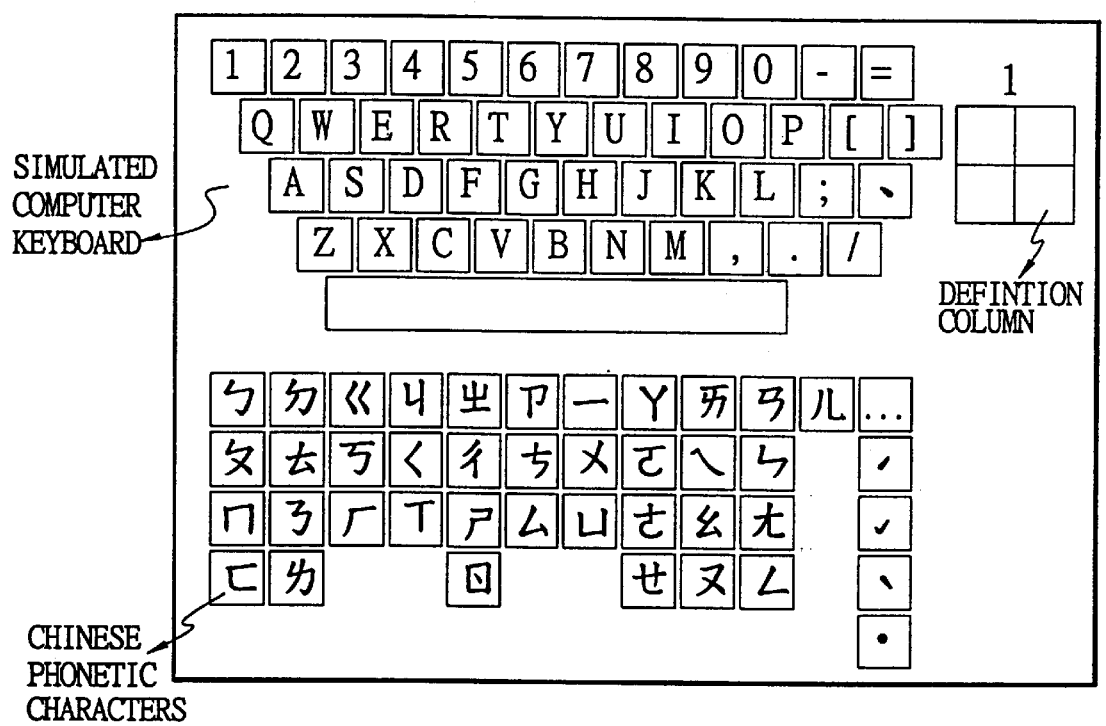
FIG. 3 illustrates a phonetic keyboard position defining device of the preferred embodiment of the present invention.

Referring to FIG. 3, the phonetic keyboard position defining device 30 of this embodiment is to be shown on the display device 40, and is constituted by a simulated computer keyboard that simulates the standard computer keyboard, a set of Chinese phonetic characters, and a definition column. In the present embodiment, after the user has pointed to a selected Chinese phonetic character on the display device 40 with the use of the computer mouse 10, the selected Chinese phonetic character can be dragged onto a chosen key of the simulated computer keyboard, thereby defining a phonetic keyboard position. Only one Chinese phonetic character is dragged onto the chosen key of the simulated computer keyboard if the chosen key is to be associated with only one sound. If a sound is to be associated with more than one key, the corresponding Chinese phonetic character is dragged onto each of the chosen keys. In this embodiment, the definition column permits each key of the simulated computer keyboard to be associated with up to 4 Chinese phonetic characters.

Reference numeral 50 denotes a phonetic keyboard position register for storing the Chinese phonetic characters and the positions thereof on the simulated computer keyboard as defined with the use of the phonetic keyboard position defining device 30.

Reference numeral 70 denotes a character sound grouping rules table that is stored in a memory device and that groups the Chinese phonetic characters into several groups based on mutual acceptance and mutual rejection among finals, initials, medials and tones of the Chinese language. In order to enable the user to conveniently define a rational Chinese phonetic keyboard without bothering with the mutual acceptance and the mutual rejection among the phonetic characters, the present invention compares the following four major groups of Chinese phonetic characters, i.e., the finals and the corresponding wade system of romanization, initials and the corresponding wade system of romanization, medials and the corresponding wade system of romanization and tones, with each other:

---

Initials: ㄅ (b)　ㄆ (p)　ㄇ (m)　ㄈ (f)　ㄉ (d)　ㄊ (t)

ㄋ (n)　ㄌ (l)　ㄍ (g)　ㄎ (k)　ㄏ (h)　ㄐ (j)

-continued

| | | | | | | | | | | | |
|---|---|---|---|---|---|---|---|---|---|---|---|
| | ㄑ | (q) | ㄒ | (x) | ㄓ | (zh) | ㄔ | (ch) | ㄕ | (sh) | |
| | ㄖ | (r) | ㄗ | (z) | ㄘ | (c) | ㄙ | (s) | | | |
| Medials: | ㄧ | (i) | ㄨ | (u) | ㄩ | (v) | | | | | |
| Finals: | ㄚ | (a) | ㄛ | (o) | ㄜ | (e) | ㄝ | (e) | ㄞ | (ai) | ㄟ (ei) |
| | ㄠ | (ao) | ㄡ | (ou) | ㄢ | (an) | ㄣ | (en) | ㄤ | (ang) | |
| | ㄥ | (eng) | ㄦ | (er) | | | | | | | |

Tones: (First tone), ' (Second tone), v (Third tone), ` (Fourth tone)

Based on the results of the comparison, the 41 Chinese phonetic characters are rearranged into 13 groups to take into consideration the mutual acceptance and the mutual rejection thereamong:

| Group 1: | ㄅ ㄆ ㄇ ㄈ ㄉ ㄊ ㄋ ㄌ |
|---|---|
| Group 2: | ㄍ ㄎ ㄏ |
| Group 3: | ㄐ ㄑ ㄒ |
| Group 4: | ㄓ ㄔ ㄕ ㄖ ㄗ ㄘ ㄙ |
| Group 5: | ㄧ ㄩ |
| Group 6: | ㄨ |
| Group 7: | ㄚ ㄛ ㄞ ㄠ ㄡ ㄢ ㄣ ㄤ |
| Group 8: | ㄜ |
| Group 9: | ㄝ |
| Group 10: | ㄟ |
| Group 11: | ㄥ |
| Group 12: | ㄦ |
| Group 13: | Tones: (First tone), ' (Second tone), v (Third tone), ` (Fourth tone) |

As shown in FIG. 4, a two-dimensional table is used to indicate mutual acceptance or mutual rejection between two groups. Reference character (o) indicates a mutual acceptance relationship, wherein the Chinese phonetic characters in the two groups can be defined on the same key. Reference character (x) indicates a mutual rejection relationship, wherein the Chinese phonetic characters in the two groups cannot be defined on the same key. Thus, the process of verifying whether or not the phonetic keyboard that was defined by the user is rational has been made easier.

Figure 2:
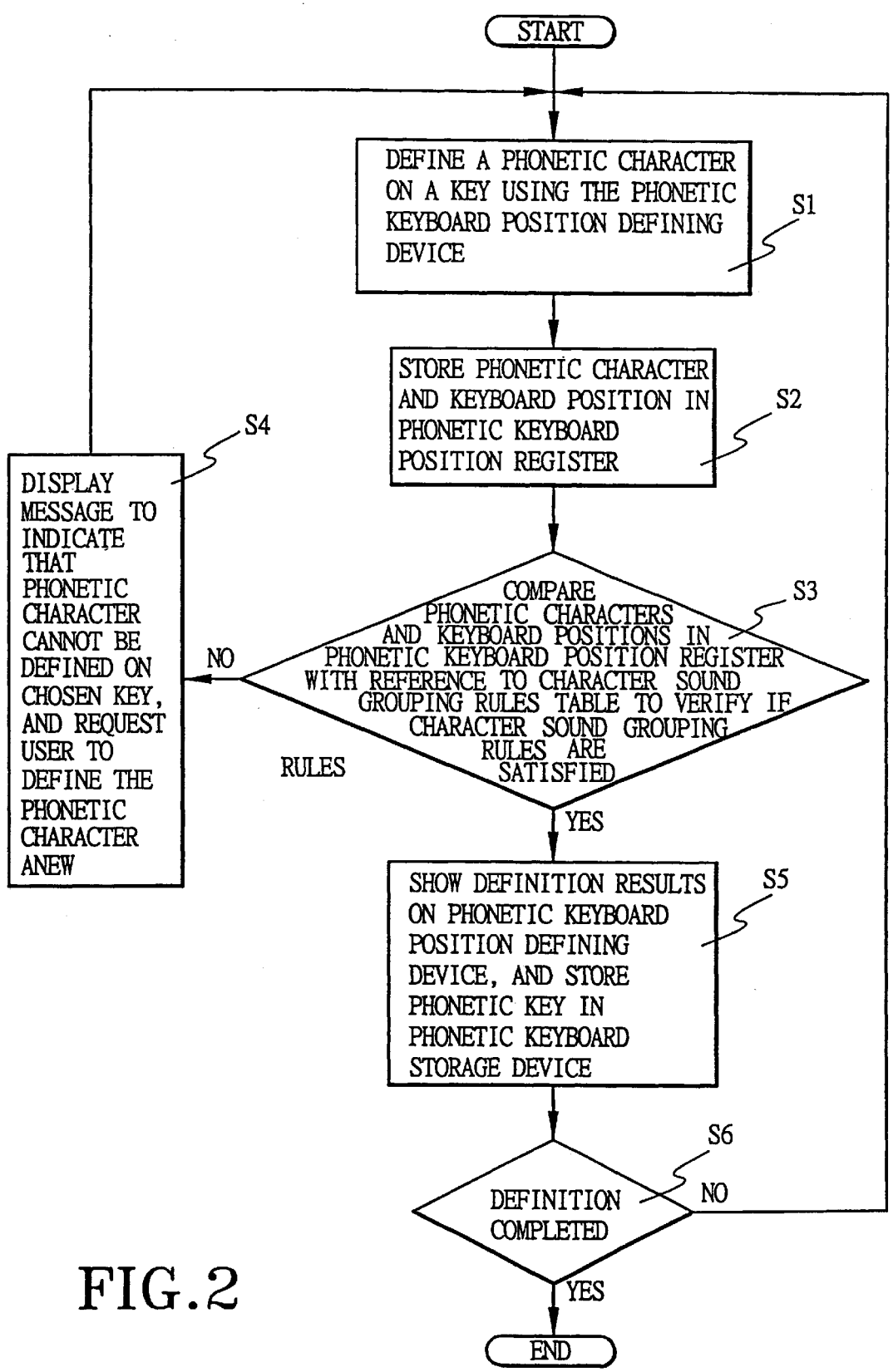
FIG. 2 is a flowchart illustrating the operation of the preferred embodiment of the present invention when used to define a Chinese phonetic keyboard.

Reference numeral 60 denotes a phonetic keyboard position verifying device. According to the Chinese phonetic characters stored in the phonetic keyboard position register 50, and with reference to the character sound grouping rules table 70, the phonetic keyboard position verifying device 60 verifies whether the positions of the Chinese phonetic characters as defined on the simulated computer keyboard can be established and whether conflict with other Chinese phonetic characters has occurred. The operation of the phonetic keyboard position verifying device 60 is shown in FIG. 2. In step S1, after using the phonetic keyboard position defining device 30 to define a Chinese phonetic character on a chosen key of the simulated computer keyboard, the flow proceeds to step S2, where the Chinese phonetic character and the chosen key are stored in the phonetic keyboard position register 50. Thereafter, in step S3, the Chinese phonetic characters stored in the phonetic keyboard position register 50 are compared among themselves with reference to the character sound grouping rules table 70 to determine if a conflict has occurred during definition, i.e. whether mutual rejection was detected. If mutual rejection was detected, the flow proceeds to step S4, where the defined Chinese phonetic character is rejected, and the user is requested to define the Chinese phonetic character anew. If mutual rejection was not detected in step S3, the flow proceeds to step S5, where the results of the definition using the phonetic keyboard position defining device 30 are shown on the display device 40. The flow eventually proceeds to step S6, where it is determined if the definition of a Chinese phonetic keyboard has been completed. If the definition is not yet complete, the flow goes back to step S1. Otherwise, the process of verifying the phonetic keyboard positions is terminated.

Reference numeral 80 denotes a phonetic keyboard storage device for storing the phonetic keys that were verified by the phonetic keyboard position verifying device 60, and that is connected to the standard computer keyboard 20 for signal transmission therewith. Once the user has defined a Chinese phonetic keyboard, the user can use the standard computer keyboard to input Chinese characters according to the phonetic keys that were defined by him.

Figure 5:
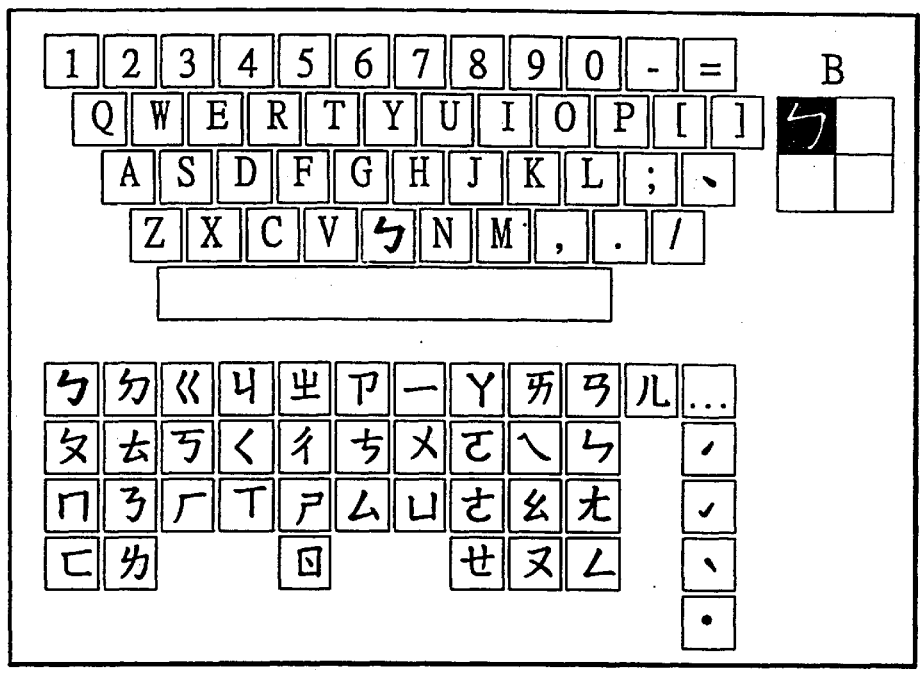
FIG. 5A illustrates how the keyboard position of the Chinese phonetic character "ㄅ" can be defined in accordance with the preferred embodiment of the present invention.
FIG. 5B illustrates how the keyboard position of the Chinese Aㄣ. phonetic character "ㄨ" can be defined in accordance with the preferred embodiment of the present invention.
FIG. 5C illustrates how the keyboard position of the Chinese phonetic character "ㄨ" can be defined in accordance with the preferred embodiment of the present invention.
Figure 5:
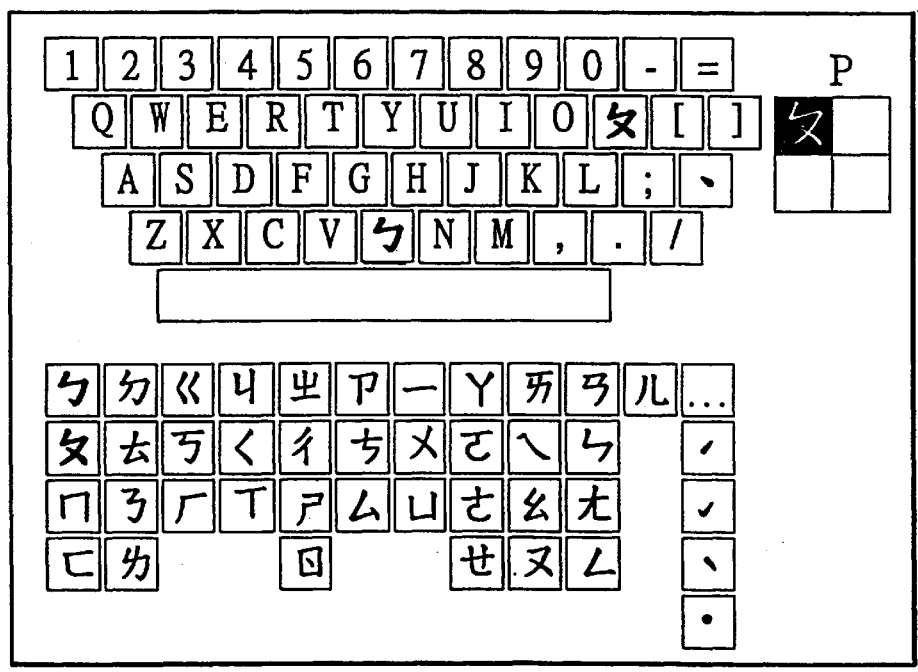
Figure 5:
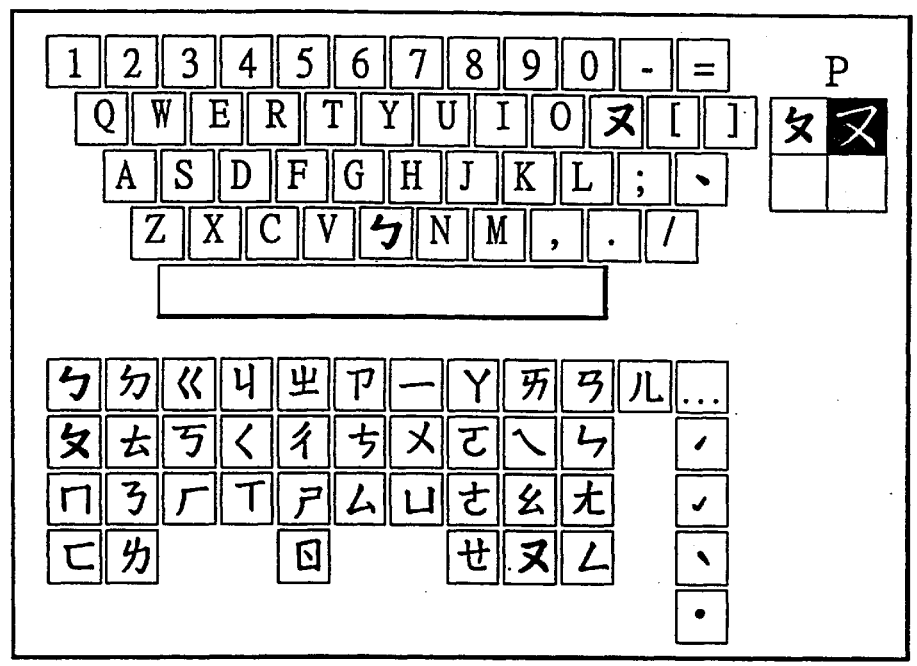
Figure 6:
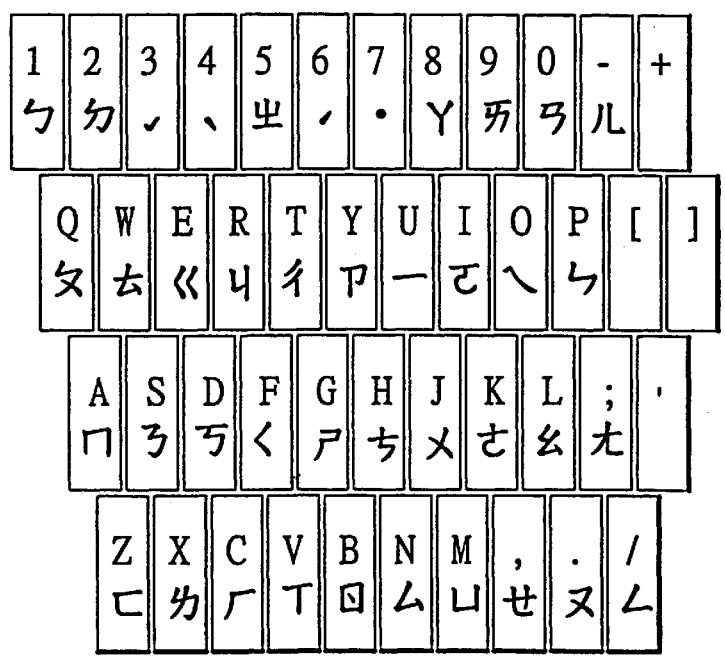
FIG. 6 illustrates the keyboard arrangement of a conventional standard Chinese phonetic keyboard.
Figure 7:
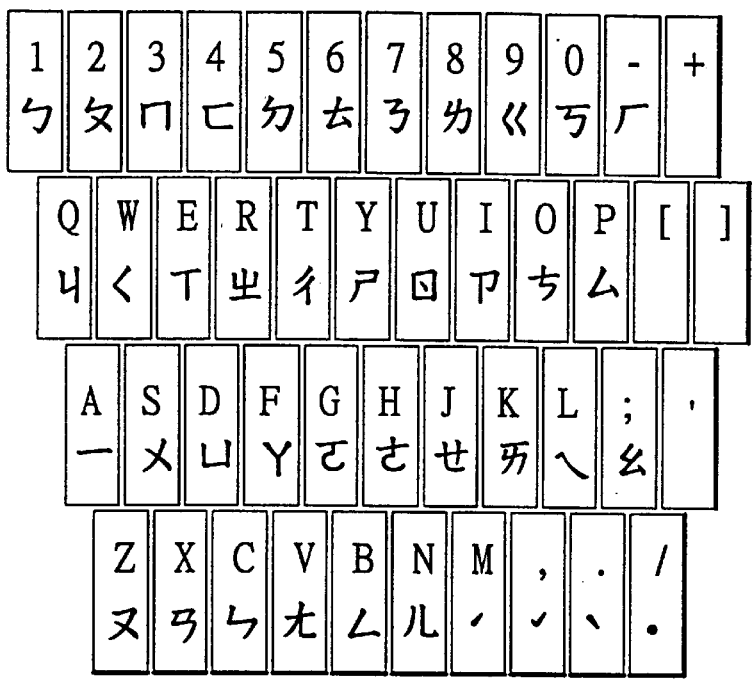
FIG. 7 illustrates the keyboard arrangement of a conventional IBM Chinese phonetic keyboard.
Figure 8:
FIG. 8 illustrates the keyboard arrangement of a conventional I Tien 41-key Chinese phonetic keyboard.
Figure 9:
FIG. 9 illustrates the keyboard arrangement of a conventional I Tien 26-key Chinese phonetic keyboard.
Figure 10:
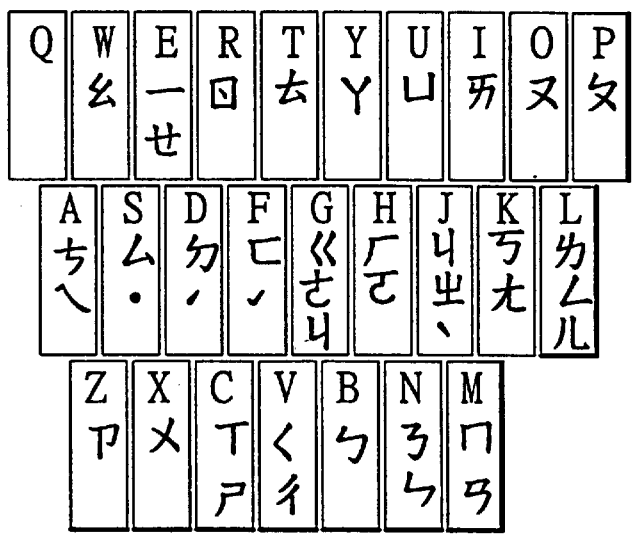
FIG. 10 illustrates the keyboard arrangement of a conventional Hsu Shih Chinese phonetic keyboard.

In the following example, the Chinese phonetic characters "ㄅ" and "ㄨ" are "ㄨ" used to illustrate the operation of the general Chinese phonetic keyboard setting apparatus of this invention. In step S1, when the user points to the region of the Chinese phonetic character "ㄅ" at the phonetic keyboard position defining device 30 with the use of the computer mouse 10, and drags the same to the region of the "b" key on the simulated computer keyboard, the Chinese phonetic character "ㄅ" and the selected key "b" are stored in the phonetic keyboard position register 50 in step S2. In step S3, the phonetic keyboard position verifying device 60 compares the phonetic keyboard positions defined in the phonetic keyboard position register 50 thereamong with reference to the character sound grouping rules table 70. Since only one definition is currently stored in the phonetic keyboard position register 50, no conflict with other Chinese phonetic characters has occurred. Thus, as shown in FIG. 5A, the Chinese phonetic character "ㄅ" is shown on the display device 40 with a lighter background in step S5, and the Chinese phonetic character "ㄅ" overlies "b" key on the simulated computer keyboard. At the same time, the definition column will indicate that the "b" key has been defined with the Chinese phonetic characterize "ㄅ" in the phonetic keyboard position defining device 30. In step S6, it is determined that the definition of a Chinese phonetic keyboard has not yet been completed, and the flow goes back to step S1 to enable the user to continue with the definition process.

Back in step S1, when the user drags the Chinese phonetic character "ㄨ" in the phonetic keyboard position defining device 30 to the region of the "b" key on the simulated computer keyboard, the Chinese phonetic character "ㄨ" and the selected key "b" are stored in the phonetic keyboard position register 50 in step S2. In step S3, the phonetic keyboard position verifying device 60 compares the keyboard positions of the Chinese phonetic characters and "ㄅ" stored "ㄨ" the phonetic keyboard position register 50 with reference to the character sound grouping rules table 70. Since the Chinese phonetic characters "ㄅ" and "ㄨ" have a mutual rejection relationship, they cannot be defined on the same key. Thus, the user is alerted in step S4 that the Chinese phonetic character "ㄨ" cannot be defined on the "b" key, and the Chinese phonetic character "ㄨ" is moved automatically back to the set of Chinese phonetic characters. At the same time, the user is requested to define a new position for the Chinese phonetic character "ㄨ".

Back in step S1, when the user defines the Chinese phonetic character "ㄨ" at the phonetic keyboard position defining device 30 on the "p" key of the simulated computer keyboard, the Chinese phonetic character "ㄨ" and the selected key "p" are stored in the phonetic keyboard position register 50 in step S2. As shown in FIG. 5B, after it has been determined in step S3 that no conflict has occurred, the Chinese phonetic character "ㄨ" is shown on the display device 40 with a lighter background, and the Chinese phonetic character "ㄨ" overlies the "p" key on the simulated computer keyboard. At the same time, the definition column will indicate that the "p" key has been defined with the Chinese phonetic character "ㄨ" in the phonetic keyboard position defining device 30. Subsequently, in step S6, it is determined that the definition of the Chinese phonetic keyboard has not yet been completed, and the flow once again goes back to step S1 to enable the user to continue with the definition process.

Back in step S1, when the user drags the Chinese phonetic character "ㄨ" to the "p" key on the simulated computer keyboard, the Chinese phonetic character "ㄨ" and the selected key "p" are stored in the phonetic keyboard position register 50 in step S2. In step S3, the phonetic keyboard position verifying device 60 compares the keyboard positions of the Chinese phonetic characters "ㄅ", "ㄨ", and "ㄨ" stored in the phonetic keyboard position register 50 with reference to the character sound grouping rules table 70. Since the phonetic characters "ㄅ" and "ㄨ" are defined on different keys and do not result in any conflict, and since the characters "ㄅ" and "ㄨ" have a mutual acceptance relationship as shown in the table of FIG. 4 and can thus be defined a on the same key, the Chinese phonetic character "ㄨ" is shown on the display device 40 with a lighter background, and the Chinese phonetic character "ㄨ" is replaced by the character "ㄨ" on the "p" key of the simulated computer keyboard, as shown in FIG. 5C. At the same time, the definition column will indicate that the "p" key has been defined with the Chinese phonetic characters "ㄨ" and "ㄨ". By means of the above procedure, a complete Chinese phonetic keyboard can be defined.

The present invention should not be limited to the foregoing embodiment. Modifications are possible as long as the main purpose remains. For example, the phonetic keyboard position defining device 30 of the preferred embodiment should not be limited to "one sound, one key" or "one sound, several keys" or "one key, several sounds." More than two keys can be combined to form a sound. For example, the Chinese phonetic character "ㄢ" can be defined using the "a" and "n" keys. As long as the phonetic keyboard position defining device 30 is modified to enable the user to define alphanumeric key positions in the Chinese phonetic character set, a phonetic keyboard based on the Wade system of romanization can be established. Moreover, in the phonetic keyboard position defining device 30 of the foregoing embodiment, the Chinese phonetic characters are dragged onto the simulated computer keyboard to define the phonetic keyboard positions. It is possible to make modifications for dragging the keys on the simulated computer keyboard onto the Chinese phonetic character set to define the phonetic keyboard positions.

The present invention overcomes the drawbacks of conventional fixed keyboards, e.g., they do not meet personal Chinese character input requirements (such as some sounds must be inputted frequently) and habits, and they are inconvenient to use because of the need for a large amount of time to memorize and familiarize. The present invention is also suitable for use with any phonetic input method without the need for becoming accustomed to another fixed computer keyboard. For people who prefer typing in English, a phonetic keyboard based on the Wade system of romanization can be defined to greatly improve the speed of inputting Chinese characters.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A general Chinese phonetic keyboard setting apparatus, comprising:

a computer mouse;

a standard computer keyboard of a computer system;

a display device;

a memory device having a character sound grouping rules table stored therein, the table grouping Chinese phonetic characters into several groups based on mutual acceptance and mutual rejection among finals, initials, medials and tones of the Chinese phonetic characters;

a phonetic keyboard position defining device connected to the computer mouse, the standard computer keyboard and the display device, the phonetic keyboard position defining device generating a simulated computer keyboard that is a computer simulation of the standard computer keyboard, and controlling the display device to show the simulated computer keyboard and a set of the Chinese phonetic characters thereon, the phonetic keyboard position defining device further permitting a selected one of the Chinese phonetic characters to be set on a selected key of the simulated computer keyboard through use of the computer mouse;

a phonetic keyboard position register connected to the phonetic keyboard position defining device, and storing the Chinese phonetic characters and positions thereof on the simulated computer keyboard as defined through use of the phonetic keyboard position defining device;

a phonetic keyboard position verifying device connected to the phonetic keyboard position register and the memory device, the phonetic keyboard position verifying device referring to the character sound grouping rules table in the memory device and comparing the Chinese phonetic characters and the positions thereof on the simulated computer keyboard as stored in the phonetic keyboard position register to verify if the positions of the Chinese phonetic characters on the simulated computer keyboard as defined can be established; and a phonetic keyboard storage device connected to the phonetic keyboard position verifying device to store phonetic keys that were verified thereby, the phonetic keyboard storage device being further connected to the standard computer keyboard for signal transmission therewith.

2. The general Chinese phonetic keyboard setting apparatus as claimed in claim 1, wherein the character sound grouping rules table is based on the table shown in FIG. 4.

* * * * *

UNITED STATES PATENT AND TRADEMARK OFFICE
CERTIFICATE OF CORRECTION

PATENT NO. : 6,281,884 B1
DATED : August 28, 2001
INVENTOR(S) : L. Chang et al.

It is certified that error appears in the above-identified patent and that said Letters Patent is hereby corrected as shown below:

<u>Title page,</u>
Item [56] References Cited, the following document was omitted and should be included:
-- An English Language Abstract of Chinese Patent No. 1105763. --
Item [56] References Cited, the following U.S. patent document was omitted and should be included.
-- 4,872,196    10/1989    Royer et al.    455/564 --

Signed and Sealed this

Second Day of April, 2002

Attest:

JAMES E. ROGAN
*Attesting Officer*        *Director of the United States Patent and Trademark Office*